United States Patent [19]

Alexander et al.

[11] Patent Number: 4,755,128
[45] Date of Patent: Jul. 5, 1988

[54] APPARATUS FOR RELEASING A PRESS-FORMED ARTICLE FROM A DIE SET

[75] Inventors: Garold W. Alexander, Noblesville; Joe L. Fortney, Gas City, both of Ind.

[73] Assignee: Peerless Machine & Tool Corporation, Marion, Ind.

[21] Appl. No.: 913,761

[22] Filed: Sep. 30, 1986

[51] Int. Cl.[4] ............................................. B29C 51/44
[52] U.S. Cl. .................... 425/292; 249/66 C; 425/351; 425/422; 425/437; 425/444; 425/520
[58] Field of Search ............... 425/383, 403.1, 436 R, 425/436 RM, 437, 444, 292, 422, 537, 554, 584, DIG. 51, 350, 351, 178, 520; 264/37, 210.3; 249/66 R, 66 A, 66 C

[56] References Cited

U.S. PATENT DOCUMENTS

| | | | |
|---|---|---|---|
| 3,153,262 | 10/1964 | Steketee | 425/444 |
| 4,149,841 | 4/1979 | Patterson | 425/398 |
| 4,246,223 | 1/1981 | Patterson | 264/292 |
| 4,289,726 | 9/1981 | Potoczky | 264/318 |
| 4,304,747 | 12/1981 | Lake | 425/292 |
| 4,364,895 | 12/1982 | Underwood | 264/335 |
| 4,440,702 | 4/1984 | Susnjara | 425/437 |
| 4,514,353 | 4/1985 | Alexander et al. | 264/294 |
| 4,521,367 | 6/1985 | Underwood | 264/318 |
| 4,647,274 | 3/1987 | Oda | 425/437 |

FOREIGN PATENT DOCUMENTS 43-12023  5/1968  Japan .

*Primary Examiner*—Jay H. Woo
*Assistant Examiner*—C. Scott Bushey
*Attorney, Agent, or Firm*—Barnes & Thornburg

[57] ABSTRACT

An improved apparatus and method as provided for releasing sheet material press-formed in a die assembly between mating male and female dies from the die assembly. A first air supply system is provided for injecting air between the male die and sheet material in the die assembly to break any vacuum existing between the male die and the sheet material. Subsequently, a second air supply system is provided for injecting air between the female die and sheet material in the die assembly during ejection of a press-formed article from the female die so as to break any vacuum existing therebetween. A system is provided for discharging excess trim waste severed from the press-formed article and routing the trim waste toward a scrap collector while permitting the article to be routed in another direction toward an article collector.

24 Claims, 2 Drawing Sheets

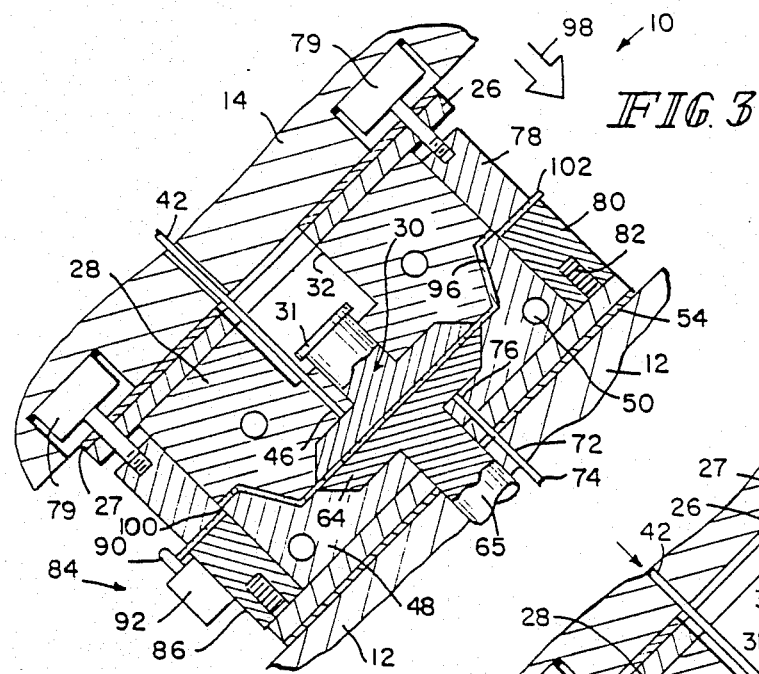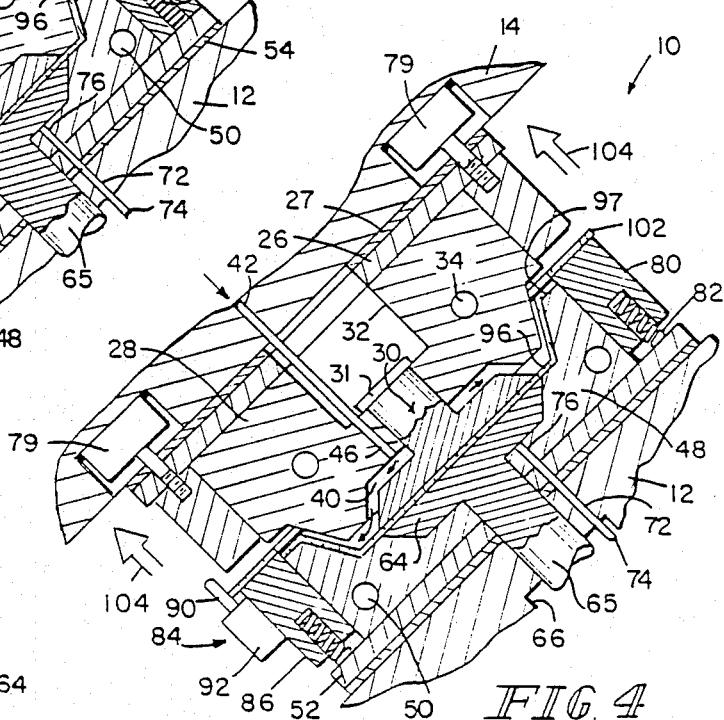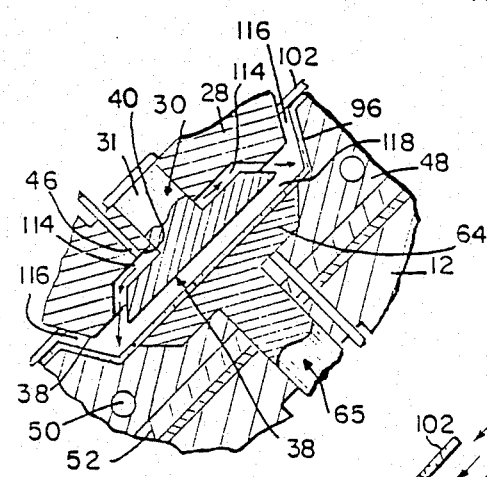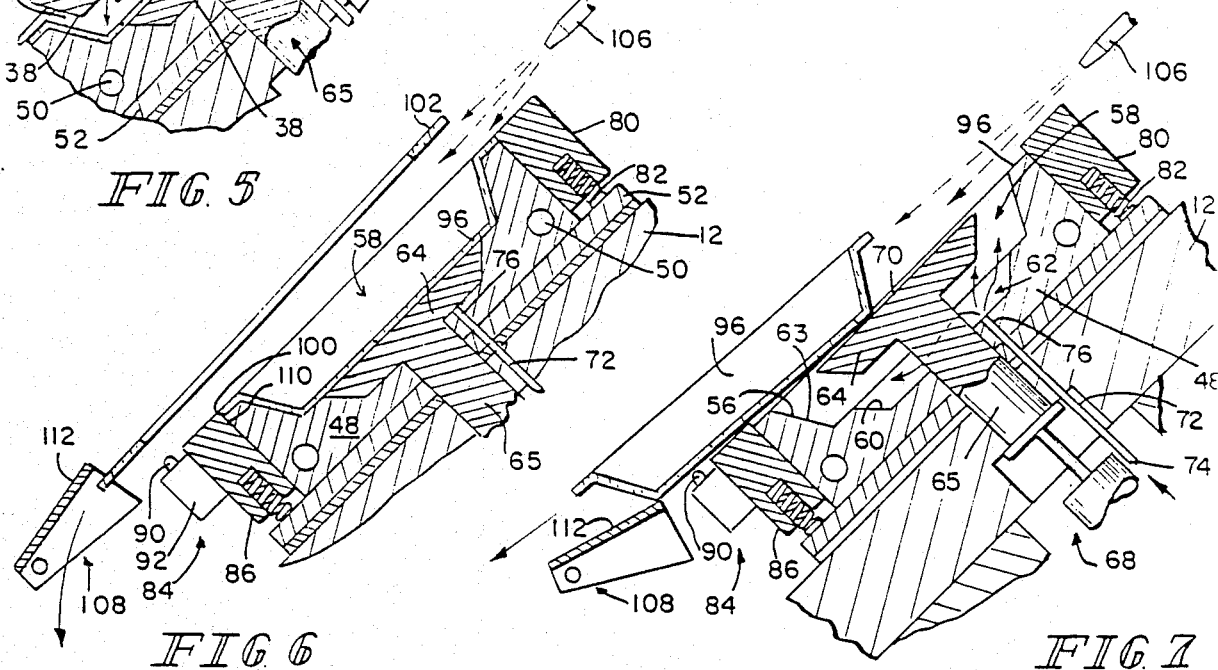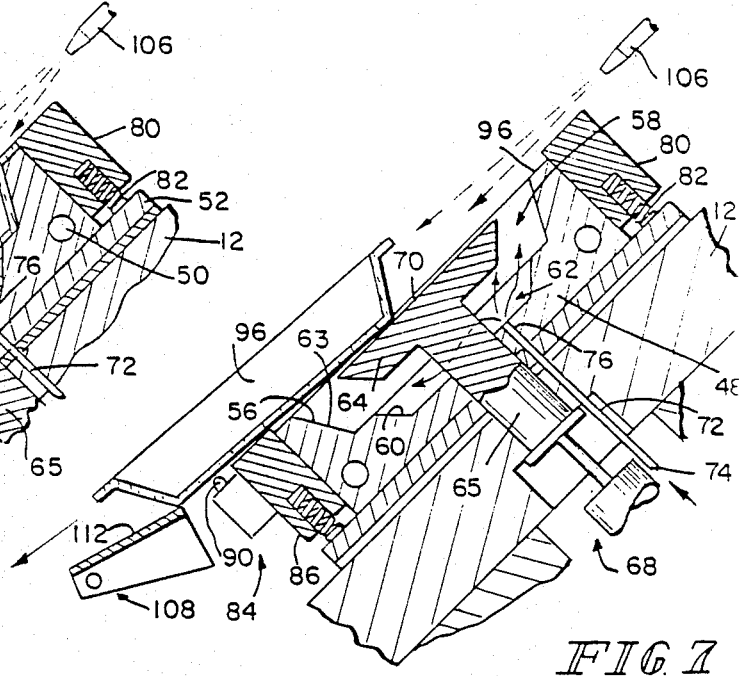

APPARATUS FOR RELEASING A PRESS-FORMED ARTICLE FROM A DIE SET

BACKGROUND AND SUMMARY OF THE INVENTION

The present invention relates to a die set for press-forming an article from sheet material, and particularly to a system for breaking any vacuum created between the die set and the article during press-forming of the sheet material to aid in releasing the article from the die set.

Press-formed articles are often damaged during manufacture as a result of article-sticking problems that arise during operation of the die press. Sheet material that has been press-formed under high pressure to produce an article has a tendency to stick to the male and/or female die due to creation of a vacuum between such die(s) and the sheet material during press-forming of the article. Damage to the article or other disruption to the press cycle can occur during release of the article from the press as a result of such a vacuum-induced sticking problem.

It has been observed that the foregoing sticking problem occurs frequently when articles are formed in a thermal press from blanks comprising polymer-impregnated paper sheet material. At predetermined high pressures and temperatures, the heated polymeric material impregnated in the paper sheet material is activated to flow and consolidate the substantially paper article. Such a conversion causes the finish-formed article to look and feel like plastic even though it is mostly paper and other non-plastic ingredients. Before it is pressed, the polymer-impregnated material has a rough porous surface. After pressing, the material has a less porous surface resulting in a smooth, plastic feel preferred by many consumers. Formation of such a smooth surface against the male and/or female die during operation of the thermal press increases the likelihood that a vacuum will be created between the surface and said die(s), thereby resulting in sticking problems associated with a vacuum at the interface between a die and a press-formed article in the die.

One object of the present invention is to provide means for breaking vacuums created during press-forming of an article in a die press at one or more selected stages of each press cycle to aid in dislodging a press-formed article upon separation of mating male and female dies and preparatory to ejection of the article from the die press.

Another object of the present invention is to provide improved means for separating trim waste from a preformed sheet material article.

In accordance with the present invention, an improved die set is provided for forming an article from sheet material. The die set includes male die means, female die means, and press means for providing relative movement between the male and female die means to press sheet material positioned therebetween, thereby forming the article. Dislodging means is provided for selectively injecting air between the press-formed sheet material and at least one of the male and female die means during separation of the male and female die means. When activated, the dislodging means acts to break any vacuum formed, as the sheet material is pressed, between said press-formed sheet material and said at least one of the male and female die means.

In preferred embodiments, the dislodging means is set up to break a vacuum created between the sheet material and the male die means and further includes first air supply means associated with the male die means. Desirably, the male die means includes a male mold element, clamp means adjacent the male mold element for selectively holding the sheet material against the female die means during separation of the male mold element and the female die means, and means for providing relative movement between the clamp means and the male mold element to permit movement of the male mold element relative to the female die means.

The clamp means and the male mold element cooperate to define a passageway therebetween interconnecting the first air supply means and the press-formed sheet material during separation of the clamp means and the male mold element. Provision of this passageway permits air from the first air supply means to be injected between the male die means and the press-formed sheet material. Advantageously, this injected air aids in breaking any vacuum which may have been created between the male mold element and the press-formed sheet material during formation of the article in the die set.

The male die means further includes retraction means for moving the clamp means away from the female die means. The first air supply means desirably includes a source of compressed air having a pressure selected to exert a substantially predetermined force on the press-formed sheet material. Advantageously, the compressed air acts to hold the sheet material against the female die means during movement of the clamp means away from the female die means. Furthermore, the passageway provided in between the clamp means and the male mold element communicates with an interface between the clamp means and the press-formed sheet material. This arrangement advantageously permits compressed air from the first air supply means to be injected between the clamp means and the press-formed sheet material to break any vacuum formed therebetween while the compressed air continues to exert a downward force on the sheet material in the female die means.

Also in preferred embodiments, the dislodging means is set up to break a vacuum created between the sheet material and the female die means and further includes second air supply means associated with the female die means. Desirably, the female die means includes a female mold element and ejector means for ejecting an article formed in the female mold element, and means for providing relative movement between the ejector means and the female mold element. The female mold element and the ejector means cooperate to define a passageway therebetween interconnecting the second air supply means and the press-formed sheet material during separation of the female mold element and the ejector means. Provision of this passageway permits air from the second air supply means to be injected between the female die means and the press-formed sheet material to aid in breaking any vacuum created therebetween.

The improved die set further includes trim means for separating the press-formed sheet material into the article and excess trim waste so as to define a peripheral edge of the article and discharge means for selectively moving the excess trim waste away from the female die means. Illustratively, the discharge means includes an air nozzle for blowing either the excess trim waste or the article away from the female die means and a deflector for selectively routing the excess trim waste toward a scrap collector and the article in another direction toward an article collector.

Also in accordance with the present invention an improved method is provided of releasing sheet material press-formed in a die assembly between mating male and female die means from the die assembly. Illustratively, the method includes the steps of initially injecting air between the male die means and sheet material in the die assembly to break any vacuum created between the male die means and said sheet material during press-forming of the sheet material, and subsequently injecting air between the female die means and sheet material in the die assembly to break any vacuum created between the female die means and said sheet material during press-forming of the sheet material. In preferred embodiments, the method further includes the steps of cutting the press-formed sheet material to provide an article, withdrawing the male die means from mating engagement with the female die means after the sheet material is press-formed while injecting air between the male die means and the press-formed sheet material, and subsequently ejecting the article from the female die means while injecting air between the female die means and the press-formed sheet material.

Also, in preferred embodiments, the method further includes the steps of clamping the sheet material against the female die means during the initial injecting step using a clamp that is movably supported in the male die means, separating the male die means and the clamp to define a space therebetween communicating with an interface between the male die means and the sheet material for receiving initially injected air, providing a source of compressed air having a predetermined pressure, and using the compressed air to accomplish the initial air-injecting step so that a pneumatic-biasing force corresponding to the pressure of the compressed air is exerted on the clamped sheet material, thereby aiding in holding the sheet material against the female die means. The clamp and the male die means desirably cooperate to define a molding surface for engaging the sheet material and pressing the sheet material into the female die means.

Subsequently, the clamp is moved away from the female die means. The predetermined pressure is selected to retain the pneumatically-biased sheet material in clamped position during such movement of the clamp. Advantageously, the compressed air penetrates an interface between the clamp and the sheet material to break any vacuum created therebetween during forming of the sheet material.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a view of the die set of FIG. 2 showing operation of a trim ring to define the peripheral edge of an article formed in the die press;

FIG. 4 is a view of the die set of FIG. 2 showing clamping of the article against the female die after retraction of a male mold element and trim assembly;

FIG. 5 is a fragmentary view of the die set of FIG. 2, with additional portions broken away, illustrating pneumatic-biasing of the article against the female die during movement of the clamp away from the article;

FIG. 6 is an enlarged view of a lower portion of the die set of FIG. 2 illustrating removal of trim waste from the female die; and FIG. 7 is a view similar to FIG. 6 illustrating ejection of the press-formed article from the female die in a direction toward an article-stacker.

DETAILED DESCRIPTION OF THE DRAWINGS

The press die apparatus 10 is used to convert sheet material into an article which may have a wide variety of shapes, sizes, and configurations. In the illustrated embodiment, apparatus 10 is a thermal press die for converting plastic-impregnated paper into trays of the type used in the convenience food industry. The thermal press die produces a tray under high pressure and temperature from paper sheet material impregnated at the paper mill with plastic filler. A tray or other article formed from this known sheet material has an appearance resembling that of a high-quality plastic tray and can be made at a fraction of the cost.

Apparatus 10 is provided with a novel pneumatic system for improving the release of articles from article-forming dies by breaking vacuums created between the article and the dies during press-forming of the articles. While this system is particularly well-suited for use in releasing press-formed articles made from plastic-impregnated paper sheet material, it also has widespread application in the sheet material conversion art generally.

Figure 1:
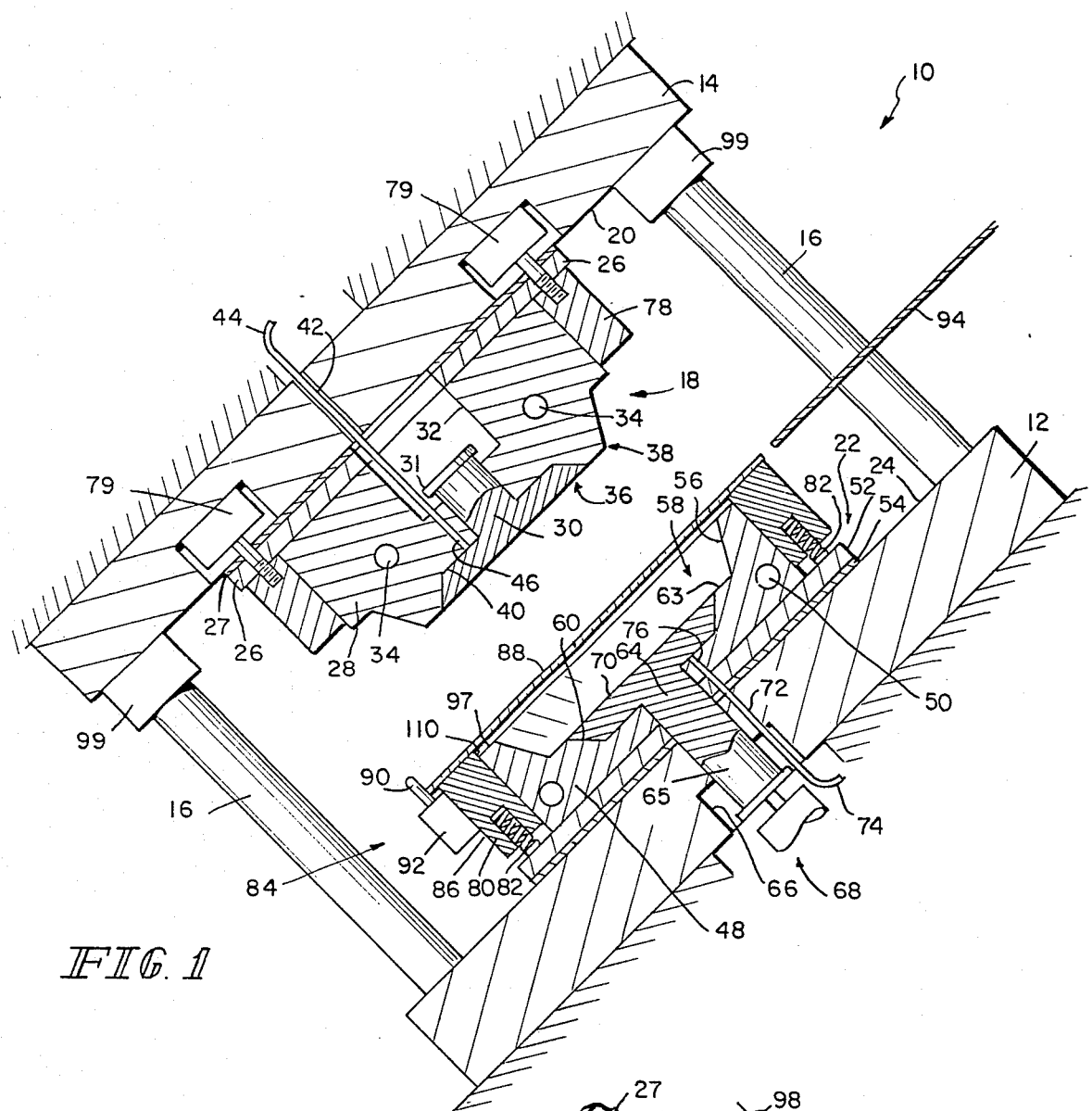
FIG. 1 is a fragmentary sectional view of a preferred embodiment of an inclined die set for performing the method of the present invention, with portions broken away, showing a sheet material blank loaded into a die press at the beginning of a press cycle prior to operation of the die press.

Referring initially to FIG. 1, the press die apparatus 10 includes a lower die shoe 12 and an upper die shoe 14. The upper die shoe 14 is movable relative to lower die shoe 12 on die post 16 using conventional means (not shown). A male die assembly 18 is affixed to a downwardly-facing surface 20 of the upper die shoe 14 and a female die assembly 22 is affixed to an upwardly-facing surface 24 of the lower die shoe 12 in confronting relation to the male die assembly 18.

Male die assembly 18 includes a base plate 26 supported on insulating material 27, a male mold element 28 depending from the base plate 26, and a movable clamp 30 having a support shaft 31 extending into a chamber 32 formed in the male mold element 28. Thermal means such as heating rods 34 are provided in male mold element 28 to heat the male die assembly 18 to a predetermined pressing temperature selected to activate the polymers in the plastic-impregnated sheet material. As shown best in FIG. 1, downwardly-facing mold surfaces 36, 38 of the clamp 30 and male mold element, respectively, cooperate to provide a substantially continuous male article-molding surface for pressing sheet material into the female die assembly 22.

Figure 2:
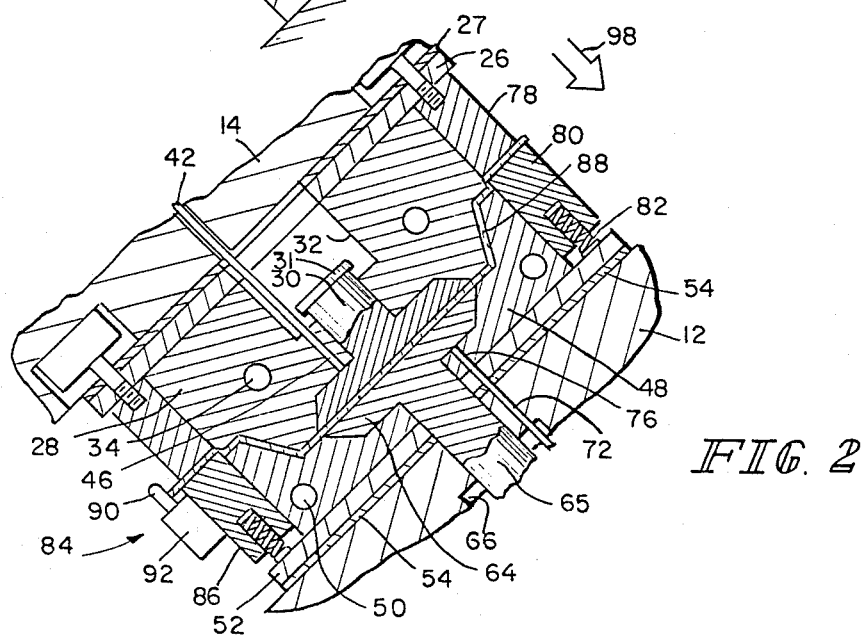
FIG. 2 is a reduced view of the die set of FIG. 1 showing mating engagement of male and female dies to press-form the blank.

The male mold element 28 also includes an inner wall 40 configured to provide a recess for receiving clamp 30 in the illustrated manner. Clamp 30 is movable between an initial position retracted within the recess provided in the male mold element 28 as shown in FIGS. 1–3 and an extended position projected away from male mold element 28 as shown in FIGS. 4 and 5 using any of a variety of known means (not shown), including, but not limited to, a pre-loaded spring system, a hydraulic system, or a pneumatic system, etc.

A first air supply tube 42 is mounted in the male die assembly 18 to extend through the male mold element 28. Tube 42 has an inlet 44 coupled to a source of compressed air (not shown) and an outlet 46 having its opening in the inner wall 40 of the male mold element 28. The first air supply tube 42 is used to direct compressed air toward an interface between the male mold assembly 18 and the sheet material.

The female die assembly 22 includes a matching female mold element 48 heated by heating rods 50 and bolted to the upwardly-facing surface 24 of lower die shoe 12 through a base plate 52 and insulating material 54. The female mold element 48 includes a first inner wall 56 configured to define a sheet material-receiving mold cavity 58 and a second inner wall 60 configured to define an ejector-receiving recess 62 having an opening in a bottom portion of inner wall 56.

The female die assembly 22 further includes an ejector 64 having a support shaft 65 extending into a chamber 66 formed in the lower die shoe 12. Ejector 64 is movable using conventional piston means 68 between an initial position retracted within the ejector-receiving recess 62 as shown in FIGS. 1–6 and an extended position projected into mold cavity 58 in a direction away from second inner wall 60 as shown in FIG. 7. As shown best in FIG. 1, the first inner wall 56 of the female mold element 48 and an upwardly-facing mold surface 70 of ejector 64 cooperate to provide a substantially continuous female article-molding surface for receiving sheet material urged into the female die assembly 22 by the male die assembly 18.

A second air supply tube 72 is mounted in the female die assembly 22 to extend through the female mold element 48. The tube 72 has an inlet 74 coupled to a source of ambient or compressed air (not shown) and an outlet 76 having an opening in the second inner wall 60 of the female mold element 48. In the preferred embodiment, the source provides ambient air.

A trim ring 78 surrounds male die assembly 18 and is movable relative thereto by air cylinder means 79 mounted in the upper die shoe 14. Air cylinder means 79 slidably extend through insulating material 27 and base plate 26 to interconnect the upper die shoe 14 and trim ring 78. A stripper ring 80 surrounds female die assembly 22 and is yieldably supported on base plate 52 for sliding movement relative to the female mold element 48 by spring means 82.

Blank-stopping means 84 is illustratively mounted to an outside wall 86 of stripper ring 80 to stop a gravity-fed blank 88 in a correct position between the male and female die assemblies 18, 22 as shown best in FIG. 1. Blank-stopping means 84 desirably includes a pair of spaced-apart retractable stop members 90 and air cylinder drive means 92 for retracting the stop members 90 from the projected positions shown in FIGS. 1–4 to the retracted positions shown in FIGS. 6 and 7.

Prior to operation of press die apparatus 10, a web of plastic-impregnated paper sheet material is drawn off a roll storage unit (not shown) and fed into a cutting station (not shown). A cutting blade (not shown) is used to form blanks 88 from the raw material. The blanks 88 are preheated as they travel along a blank transport conveyor (not shown) having platens positioned on both sides of the blanks 88. The preheated blanks are then conveyed by a sheet metal slide 94 and gravity into position over the female die assembly 22. The spaced-apart stop members 90 are actuated to stop deposited blank 88 in the correct position shown in FIG. 1.

In FIG. 1, a blank 88 is shown resting on the stripper ring 80 which holds the blank 88 a predetermined distance above a top surface 97 of the female mold element 48. The male and female mold elements 28, 48 have been heated to a predetermined plastic-activating temperature by heating rods 34, 50. The clamp 30 and ejector 64 are in retracted positions. The first air supply tube 42 contains compressed air while the second air supply tube 72 contains ambient air. Trim ring 78 is held in a retracted position shown in FIG. 1 by air cylinder means 79. During operation, clamp 30 is used to dislodge a press-formed article 96 from the male mold element 28 and the compressed air injected through first air supply tube 42 to break any vacuum formed as the article 96 is pressed.

In FIG. 2, the entire upper assembly 14, 18, 78 is urged downwardly in the direction of double arrows 98 toward the lower assembly 12, 22, 86 by hydraulic or mechanical press means (not shown) and guided by die posts 16 sliding in bushings 99. When the downwardly-facing surface 38 of male mold element 28 has reached about ⅛ inch from bottom, a valve (not shown) on the hydraulic press shifts to high pressure and causes the heated plastic in the plastic-impregnated blank 12 to flow and "consolidate" the article 96.

Just as the press reaches the full length of its stroke as shown in FIG. 3, the air cylinders 79 are pressurized, urging the trim ring 78 downwardly in the direction of double arrows 98 relative to male mold assembly 18 and past a sharp cutting edge 100 on the perimeter of the female mold element 22. This action shears or trims off excess waste material 102 from blank 88, collapses spring means 82, and forces stripper ring 80 downward in the direction of double arrows 98.

Once the article 96 has been fully formed and trimmed, it must be separated from the scrap 102 and ejected from the apparatus 10. In FIG. 4, the upper die assembly 14, 18, 78 begins an upward motion in the direction of double arrows 104. To maintain control of the article 96 and excess trim waste 102, it is imperative that the article 96 remain undisturbed in the female mold element 22. Because the article 96 is formed under tremendous pressures (e.g., up to 100 tons), there is a tendency for a vacuum to be created which will cause the article 96 to stick to the male mold element 18.

As shown in FIG. 4, the compressed air discharged through outlet 46 is introduced into a passageway 114 that is formed due to movement of male mold element 28 in the direction of double arrow 104 away from the motionless clamp 30. Therefore, as the upper assembly 14, 18, 78 moves upward, air is injected through tube 42 to maintain clamp 30 in its downward position engaging article 96 and causing air to fill the cavity and break the vacuum of the article 96 to the mold. Clamp 30 in conjunction with the compressed air is used to break any vacuum formed as the article 96 is pressed and to dislodge the press-formed article 96 from the male mold element 28.

Compressed air in passageway 114 empties into a space 116 formed between article 96 and male mold element 28. The compressed air in space 116 has a pressure selected to exert a substantially predetermined force on the article 96 to hold the article against the first inner wall 59 of the female mold element 48 during movement of the clamp 30 away from the female mold element 48. As the clamp 30 is moved relative to article 96 in direction 104, the compressed air in space 116 is injected between the clamp 30 and article 96 to break any vacuum therebetween and fills space 118.

In FIG. 6, while the upper assembly 14, 18, 78 continues to move upward, the air cylinders 92 are retracted and the stripper ring 80 biased by spring means 82 moves the trimmed scrap 102 above the level of the finished article 96. Compressed air is blown from an air nozzle 106 to clear the mold/die of the trim scrap 102. The scrap 102 is blown through a pivoting channel 108 and into a receptacle (not shown) while the article 96 is held in place by an edge 110 of the stripper ring 80.

As shown in FIG. 7, the ejector 64 is pushed upward by piston means 68 simultaneously with an injection of ambient air from tube 72 to break a vacuum created between the article 96 and the female die and lift the article 96 above the lower mold/die and onto the top 112 of the pivoting channel 108. The article 96 is blown by compressed air from the air nozzle 106 across the top 112 of the channel 108 and onto a conveyor or pile (not shown).

Although the invention has been described in detail with reference to certain preferred embodiments, variations and modifications exist within the scope and spirit of the invention as described and as defined in the following claims.

What is claimed is:

1. A die set for forming an article from sheet material, the die set comprising
    male die means,
    female die means,
    press means for providing relative movement between the male and female die means to press sheet material positioned therebetween, thereby forming the article, and
    dislodging means for selectively injecting air between the press-formed sheet material and at least one of the male and female die means during separation of the male and female die means to break any vacuum formed between said press-formed sheet material and said at least one of the male and female die means as the sheet material is pressed, the dislodging means including air supply means in the male die means for supplying air, the male die means including a male mold element, clamp means adjacent to the male mold element for selectively holding the sheet material against the female die means during separation of the male mold element and the female die means, and means for providing relative movement between the clamp means and the male mold element to permit movement of the male mold element relative to the female die means, the clamp means and the male mold element cooperating to define a passageway therebetween interconnecting the air supply means and the press-formed sheet material during separation of the clamp means and the male mold element to permit air from the air supply means to be injected between the male die means and the press-formed sheet material.

2. The die set of claim 1, wherein the male die means further includes retraction means for moving the clamp means away from the female die means, and the air supply means includes a source of compressed air having a pressure selected to exert a substantially predetermined force on the press-formed sheet material to hold the sheet material against the female die means during movement of the clamp means away from the female die means.

3. The die set of claim 2, wherein the passageway defined by the clamp means and the male mold element communicates with an interface between the clamp means and the press-formed sheet material to permit air from the air supply means to be injected between the clamp means and the press-formed sheet material to break any vacuum formed therebetween.

4. A die set for forming an article from sheet material, the die set comprising
    male die means,
    female die means,
    press means for providing relative movement between the male and female die means to press sheet material positioned therebetween, thereby forming the article, and
    dislodging means for selectively injecting air between the press-formed sheet material and at least one of the male and female die means during separation of the male and female die means to break any vacuum formed between said press-formed sheet material and said at least one of the male and female die means as the sheet material is pressed, the dislodging means including an air supply means in the female die means for supplying air, the female die means including a female mold element, ejector means for ejecting an article formed in the female mold element, and means for providing relative movement between the ejector means and the female mold element, the female mold element and the ejector means cooperating to define a passageway therebetween interconnecting the air supply means and the press-formed sheet material during separation of the female mold element and the ejector means to be permit air from the air supply means to be injected between the female die means and the press-formed sheet material.

5. A die set for forming an article from sheet material, the die set comprising
    female die means formed to include an inner wall defining a mold cavity,
    male die means for pressing sheet material into the mold cavity,
    first air supply means in the male die means for selectively injecting air into the mold cavity between the male die means and sheet material pressed by the male die means to break the vacuum formed therebetween as the sheet material is pressed, and
    second air supply means in the female die means for selectively injecting air into the mold cavity between the inner wall and sheet material pressed by the male die means to break any vacuum formed therebetween as the sheet material is pressed.

6. The die set of claim 5, wherein the male die means includes a male mold, a clamp extending into the male mold, means for reciprocating the clamp between a retracted position and an article-clamping position, and means for moving the male mold relative to the clamp, the clamp and the male mold cooperate to define a space therebetween in communication with the mold cavity during movement of the male mold relative to the clamp, and the first air supply means is situated to inject air into said space.

7. The die of claim 6, wherein the male die means includes an exposed wall and the clamp includes a forward surface that cooperates with the exposed wall when the clamp is in its retracted position to define an article-molding surface for engaging sheet material during operation of the male die means.

8. The die set of claim 6, wherein the first air supply means includes a source of compressed air having a pressure selected to exert a predetermined force on the sheet material in the mold cavity, the force acting to retain the sheet material against the inner wall of the female die means during movement of the clamp from its article-clamping position toward its retracted position.

9. The die set of claim 5, wherein the female die means includes a female mold, an ejector extending into the female mold, and means for reciprocating the ejector between a retracted position and an article-ejecting position, the ejector and the female mold cooperate to define a space therebetween in communication with the mold cavity when the ejector is moved away from its retracted position, and the second air supply means is situated to inject air into said space.

10. The die set of claim 9, wherein the ejector includes a forward surface that cooperates with the inner wall of the female die means when the injector is in its retracted position to define an article-molding surface for engaging sheet material during operation of the male die means.

11. The die set of claim 5 further comprising trim means for shearing sheet material positioned outside of the mold cavity in a predetermined pattern surrounding the mold cavity to define a peripheral edge of the article, the trim means operating to divide the sheet material into an article and excess trim waste after mating engagement of the male and female die means, and discharge means for selectively moving the excess trim waste away from the female die means.

12. The die set of claim 11, wherein the trim means provides stop means for blocking movement of the article out of the mold cavity during operation of the discharge means.

13. The die set of claim 11, wherein the discharge means includes an air nozzle positioned adjacent to an edge of the female die means to direct a current of air toward the excess trim waste, thereby lifting and propelling the excess trim waste away from the female die means.

14. The die set of claim 11, further comprising a deflector, means for ejecting articles from the female die means, and means for selectively supporting the deflector in one of a first position intercepting the excess trim waste expelled from the female die means by the discharge means toward a scrap collector and a second position intercepting articles ejected from the mold cavity by the ejector and subsequently expelled from the female die means by the discharge means toward an article collector.

15. A die set for forming an article from sheet material, the die set comprising a female die assembly including a female mold having an inner wall configured to define a portion of a mold cavity, ejecting means for ejecting an article from the female mold, the ejecting means including an ejector extending into the female mold and piston means for moving the ejector between a retracted position within the female mold and a projected position away from the female mold, the ejector including a forward wall configured to define a remaining portion of the mold cavity when the piston means is in its retracted position, and female air supply means for selectively introducing air between the female mold and the ejector as the ejector moves toward its projected position to aid in breaking a vacuum created in the mold cavity during formation of an article therein, a male die assembly including male mold means for pressing sheet material into the mold cavity, the male mold means including a movable first die for forming a portion of the article, a movable second die for forming a remaining portion of the article, the second die extending into the first die, drive means for moving the first and second dies from retracted positions to article-forming positions in the mold cavity, first retraction means for moving the first die relative to the second die away from the mold cavity to its retracted position while the second die remains in its article-forming position, second retraction means for moving the second die relative to the first die away from the mold cavity, and male air supply means for selectively introducing compressed air having a predetermined pressure between first and second dies as the first die moves relative to the second die toward its retracted position to aid in breaking a vacuum created between the first and second dies during formation of an article in the mold cavity, the compressed air introduced by the male air supply means exerting a substantially predetermined force on a portion of the sheet material in the mold cavity, thereby holding the sheet material against the inner wall of the female mold to ease separation of the second die and the sheet material to permit movement of the second die relative to the sheet material during operation of the second retraction means.

16. The die set of claim 15, further comprising trim means for shearing sheet material positioned outside of the mold cavity in a predetermined pattern surrounding the mold cavity to define a peripheral edge of the article, the trim means operating to divide the sheet material into an article and excess trim waste after mating engagement of the male and female die assemblies, and discharge means for selectively moving the excess trim waste away from the female die assembly, the trim means providing stop means for blocking movement of the article out of the mold cavity during operation of the discharge means.

17. The die set of claim 16, wherein the discharge means includes an air nozzle positioned adjacent to an edge of the female mold to direct a current of air toward the excess trim waste, thereby lifting and propelling the excess trim waste away from the female mold and the blocked article retained in the mold cavity.

18. The die set of claim 16, further comprising a deflector, and means for selectively supporting the deflector in one of a first position intercepting the excess trim waste expelled from the female die assembly by the discharge means toward a scrap collector and a second position intercepting articles ejected from the mold cavity by the ram and subsequently expelled from the female die by the discharge means toward an article collector.

19. A die set for forming an article from sheet material, the die set comprising
male die means,
female die means,
press means for providing relative movement between the male and female die means to press sheet material positioned therebetween, thereby forming the article,
trim means for separating the press-formed sheet material into the article and excess trim waste, thereby defining a peripheral edge of the article, and
discharge means for selectively moving the excess trim waste away from the female die means, the female die means being configured to provide a mold cavity and the trim means providing stop means for blocking movement of the article out of the mold cavity during operation of the discharge means.

20. A die set for forming an aritcle from sheet material, the die set comprising
male die means,
female die means,
press means for providing relative movement between the male and female die means to press sheet material positioned therebetween, thereby forming the article,
trim means for separating the press-formed sheet material into the article and excess trim waste, thereby defining a peripheral edge of the article, and
discharge means for selectively moving the excess trim waste away from the female die means, the discharge means including an air nozzle positioned adjacent to an edge of the female die means to direct a current of air toward the excess trim waste, thereby lifting and propelling the excess trim waste away from the female die means.

21. A die set for forming an article from sheet material, the die set comprising
male die means,
female die means,
press means for providing relative movement between the male and female die means to press sheet material positioned therebetween, thereby forming the article,
trim means for separating the press-formed sheet material into the article and excess trim waste, thereby defining a peripheral edge of the article,
discharge means for selectively moving the excess trim waste away from the female die means,
ejector means for ejecting articles from the female die means, and
deflector means for routing excess trim waste expelled from the female die means by the discharge means in a first direction toward a scrap collector and articles ejected from the female die means by the ejector means in a second direction toward an article collector and away from the scrap collector.

22. A die set for forming an article from sheet material, the die set comprising
male die means,
female die means,
press means for providing relative movement between the male and female die means to press sheet material positioned therebetween, thereby forming the article,
trim means for separating the press-formed sheet material into the article and excess trim waste, thereby defining a peripheral edge of the article,
discharge means for selectively moving the excess trim waste away from the female die means,
a deflector,
means for ejecting articles from the female die means, and
means for selectively supporting the deflector in one of the first position intecepting the excess trim waste expelled from the female die means by the discharge means toward a scrap collector and a position intercepting articles ejected from the mold cavity by the ejector and subsequently expelled from the female die means by the discharge means toward an article collector.

23. The die set of claim 22, wherein the discharge means includes an air nozzle positioned adjacent to an edge of the female die means to direct a current of air toward a selected one of the excess trim waste in the article, thereby lifting and propelling the selected one of the excess trim waste and the article away from the female die means.

24. The die set of claim 22, further comprising
first air supply means in the male die means for selectively injecting air between the male die means and sheet material pressed by the male die means to break a vacuum existing therebetween, and
second air supply means in the female die means for selectively injecting air between the female die means and the sheet material to break any vacuum existing therebetween.

* * * * *